(12) United States Patent
Wang et al.

(10) Patent No.: US 10,665,862 B2
(45) Date of Patent: May 26, 2020

(54) LITHIUM ION BATTERY CATHODE MATERIAL AND LITHIUM ION BATTERY

(71) Applicant: Guizhou Zhenhua E-CHEM Inc., Guiyang (CN)

(72) Inventors: Lijuan Wang, Guiyang (CN); Chaoyi Zhou, Guiyang (CN); Zhu'an Yin, Guiyang (CN); Peng Peng, Guiyang (CN); Daixiang Yang, Guiyang (CN); Qianxin Xiang, Guiyang (CN); Ming Mei, Guiyang (CN); Lu Li, Guiyang (CN)

(73) Assignee: Guizhou Zhenhua E-CHEM Inc., Guiyang (CN)

( * ) Notice: Subject to any disclaimer, the term of this patent is extended or adjusted under 35 U.S.C. 154(b) by 0 days.

(21) Appl. No.: 16/022,762

(22) Filed: Jun. 29, 2018

(65) Prior Publication Data

US 2019/0020024 A1 Jan. 17, 2019

(30) Foreign Application Priority Data

Jul. 11, 2017 (CN) .......................... 2017 1 0574938

(51) Int. Cl.
*H01M 4/525* (2010.01)
*H01M 4/505* (2010.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC .... H01M 4/25; H01M 2004/028; C01G 53/00
(Continued)

(56) References Cited

U.S. PATENT DOCUMENTS

2011/0033750 A1\* 2/2011 Hosokawa ........... C01G 53/006
429/223

OTHER PUBLICATIONS

EP Search Report dated Oct. 26, 2018 in EP 18180761.1, 7 pages.
(Continued)

*Primary Examiner* — Tri V Nguyen
(74) *Attorney, Agent, or Firm* — Lathrop GPM LLP

(57) ABSTRACT

The present invention relates to a lithium ion cathode material and a lithium ion battery. The chemical formula of the cathode material is: $Li_aNi_xCo_yMn_zM_bO_2$, wherein $1.0 \leq a \leq 1.2$; $0.00 \leq b \leq 0.05$; $0.30 \leq x \leq 0.60$; $0.10 \leq y \leq 0.40$; $0.15 \leq z \leq 0.30$; $x+y+z=1$; M is one or two or more selected from the group consisting of Mg, Ti, Al, Zr, Y, W, Mn, Ba and rare earth elements; wherein the scanning electron microscope observation shows that, the cathode material consists of secondary particles agglomerated by 10 or less primary single crystal particles and secondary particles agglomerated by more than 10 primary single crystal particles, and wherein, the area percentage of the secondary particles agglomerated by 10 or less primary single crystal particles is greater than 80%, and the area percentage of the secondary particles agglomerated by more than 10 primary single crystal particles is less than or equal to 20%. The lithium battery prepared by the cathode material of the present invention has good cycling performance, the preparation method thereof is simple, and can be conveniently and massively produced.

19 Claims, 2 Drawing Sheets

(51) Int. Cl.
*C01G 53/00* (2006.01)
*H01M 10/0525* (2010.01)
*H01M 4/02* (2006.01)

(52) U.S. Cl.
CPC ..... *H01M 10/0525* (2013.01); *C01P 2002/72* (2013.01); *C01P 2004/03* (2013.01); *C01P 2004/50* (2013.01); *C01P 2006/12* (2013.01); *C01P 2006/40* (2013.01); *H01M 2004/028* (2013.01)

(58) Field of Classification Search
USPC .................... 429/223, 207, 218.1; 252/182.1
See application file for complete search history.

(56) References Cited

OTHER PUBLICATIONS

Julien et al., (2016) Materials, 9:595 pp. 1-26 "Optimization of Layered Cathode Materials for Lithium-ion Batteries".
Zhang et al., Electochimica Acta, (2017) 227 pp. 152-161 "Kinetic Characteristics Up to 4.8V of Layered $LiNi_{1/3}Co_{1/3}Mn_{1/3}O_2$ Cathode Materials for High Voltage Lithium-ion Batteries".
Zhu et al., J. Mater. Res., (2015) 30:2 pp. 286-294 "Crystal Structure and Size Effects on the Performance of $Li[Ni_{1/3}Co_{1/3}Mn_{1/3}]O_2$ Cathodes".

* cited by examiner

LITHIUM ION BATTERY CATHODE MATERIAL AND LITHIUM ION BATTERY

RELATED APPLICATIONS

This application claims priority to Chinese patent application serial no. 201710574938.8, filed Jul. 11, 2017, the contents of which is incorporated herein by reference in its entirety.

FIELD OF THE INVENTION

The invention relates to a technical field of lithium ion battery, and specifically relates to lithium ion battery cathode material and lithium ion battery prepared by the cathode material.

BACKGROUND OF THE INVENTION

Due to its advantages of high energy density, long cycling life, low cost, beneficial for the light weight of electric vehicles and so on, ternary cathode material has become the mainstream choice of electric vehicle drive power, and there will be a greater market space in the future.

At present, most of the ternary materials in the market are secondary spherical particles which are sintered by precursors obtained by coprecipitation. In the process of coating and cold pressing, the secondary spherical particles are easily broken, the doping layer is destroyed, and the primary particles without doping easily lead to the battery high-temperature storage swollen, and affect the cycle performance. During the process of high temperature cycling, with the increase of cycle number, the primary particles of agglomerated form may be separated, which leads to the increase of internal resistance, the increase of side effect in internal battery, and the rapid decay of the cycle. Thus, there is a need to develop new lithium ion cathode material.

Chinese patent Application No. 201410327608.5 disclosed a high voltage single crystal nickel cobalt lithium manganate cathode material and preparation method thereof. Doped nickel-cobalt-manganese hydroxide precursors were prepared by co-precipitation method, then the precursors were pre-calcined at high temperature to obtain nickel-cobalt-manganese oxide. After mixing with the lithium salt and the doping element, the nickel-cobalt-manganese oxide was sintered and coated to obtain the high voltage single crystal cathode material. Patent CN201410054279.1 disclosed a preparation method of high-density nickel cobalt lithium manganate cathode material. The ternary precursor was prepared by co-precipitation method, then the precursor was pulverized at high speed to obtain single crystal ternary precursor. After mixing with the lithium salt, the single crystal ternary precursor was sintered and pulverized to obtain single crystal ternary cathode material. Patent CN201110278982.7 disclosed a cathode material for lithium ion battery and lithium ion battery using the same. A nickel salt, a cobalt salt, a manganese salt and a single crystal morphology lithium carbonate were mixed to sinter and pulverize or a precursor of nickel-cobalt-manganese and a single crystal morphology lithium carbonate were mixed to sinter and pulverize to obtain single crystal cathode material. At the same time, the morphology of the cathode material in the observation of the scanning electron microscope is single crystal morphology rather than secondary spherical morphology.

SUMMARY OF THE INVENTION

The technical problem to be solved is that, the prior art including the above patents has not clearly pointed out what shape of primary spherical single crystal particles in the observation of scanning electron microscope or what kind of single crystal particles ratio can make a lithium ion battery has good cycle performance and stability under high temperature and high voltage.

That is to say, the purpose of the present invention is that, by adjusting preparation method and adjusting the single crystal particles of the cathode materials and the ratio of the secondary particles formed by the agglomeration of the single crystal particles to prepare a lithium ion battery with better performance.

In order to solve the above technical problem, the present invention provides a lithium ion battery cathode material, a battery and applications thereof. The scanning electron microscope observation shows that, the cathode material mainly consists of the secondary particles agglomerated by 10 or less (i.e. 1-10) primary spherical single crystal particles, wherein the area percentage of the secondary particles agglomerated by 10 or less primary spherical single crystal particles is greater than 80%, and the area percentage of the secondary particles agglomerated by more than 10 (over 10) primary spherical single crystal particles is generally less than 20%. The cathode material can be applied to digital products, electric buses, energy storage, and pure electric vehicle batteries and so on.

Specifically, for the deficiencies of the prior art, the present invention provides the following technical solutions:

A lithium ion battery cathode material, characterized in that, the general formula thereof is $Li_aNi_xCo_yMn_zM_bO_2$, wherein, $1.0 \leq a \leq 1.2$; $0.00 \leq b \leq 0.05$; $0.30 \leq x \leq 0.60$; $0.10 \leq y \leq 0.40$; $0.15 \leq z \leq 0.30$; $x+y+z=1$; M element is one or two or more selected from the group consisting of Mg, Ti, Al, Zr, Y, W, Mn, Ba and rare earth elements; wherein, the scanning electron microscope, observation shows that the cathode material consists of the secondary particles agglomerated by 10 or less primary single crystal particles and the secondary particles agglomerated by more than 10 primary single crystal particles, wherein, area percentage of the secondary particles agglomerated by 10 or less primary single crystal particles is greater than 80%, and the area percentage of the secondary particles agglomerated by more than 10 primary single crystal particles is less than or equal to 20%.

Preferably, in the above cathode material, the area percentage of the secondary particles agglomerated by 10 or less primary single crystal particles is greater than 85%, preferably greater than 90%, and more preferably 95%-100%; the area percentage of the secondary particles agglomerated by more than 10 primary single crystal particles is less than or equal to 15%, preferably less than or equal to 10%, and more preferably 0%-5%.

Preferably, in the above cathode material, in the X-ray diffraction spectrum of the cathode material, the ratio of full width at half maximum FWHM (003) of the (003) diffraction peak at a diffraction angle 2θ of about 18.9° and full width at half maximum FWHM (104) of the (104) diffraction peak at a diffraction angle 2θ of about 44.4° is 0.9-1.5.

Preferably, in the above cathode material, in the X-ray diffraction spectrum of the cathode material, the full width at half maximum FWHM (101) of the (101) diffraction peak at a diffraction angle 2θ of about 36.7° is 0.050-0.100.

Preferably, in the above cathode material, in the X-ray diffraction spectrum of the cathode material, the full width at half maximum FWHM (104) of the (104) diffraction peak at a diffraction angle 2θ of about 44.4° is 0.060-0.105, and the crystallite size is 1100-2000 Å.

Preferably, in the above cathode material, in the X-ray diffraction spectrum of the cathode material, the full width at half maximum FWHM (107) of the (107) diffraction peak at a diffraction angle 2θ of about 58.6° is 0.065-0.120, and the crystallite size is 1000-3000 Å.

Preferably, in the above cathode material, in the X-ray diffraction spectrum of the cathode material, the full width at half maximum FWHM (110) of the (110) diffraction peak at a diffraction angle 2θ of about 64.9° is 0.070-0.130.

Preferably, in the above cathode material, the average particle size of the cathode material is 3.0 μm-8.0 μm.

The present invention also provides a preparation method for the above lithium ion battery cathode material, characterized in that, it comprises the following steps:

(1) Mixing a lithium source, a nickel cobalt manganese precursor, and an M source at a molar ratio of Li:(Ni+Co+Mn):M of (1.0-1.2):1.0:(0.00-0.05) to obtain a mixture;

(2) Rebaking, crushing and grading the mixture to obtain the lithium ion battery cathode material.

Preferably, in the above preparation method, in the rebaking process, the temperature of the first calcination is 700-1000° C., the temperature of the second calcination is 500-1000° C.

Preferably, in the above preparation method, in the rebaking process, the temperature of the first calcination is 900-1000° C., the temperature of the second calcination is 900-980° C.

Preferably, in the above preparation method, after the first calcination, the preparation method also comprises the process of cooling the mixture to room temperature.

Preferably, in the above preparation method, the time of the first calcination is 5-30 hours and the time of the second calcination is 3-18 hours.

Preferably, in the above preparation method, the time of the first calcination is 12-30 hours and the time of the second calcination is 15-18 hours.

Preferably, in the above preparation method, the lithium source is one or two or more selected from the group consisting of lithium hydroxide monohydrate, lithium carbonate, lithium nitrate, lithium fluoride, lithium phosphate, dilithium hydrogen phosphate or lithium dihydrogen phosphate.

Preferably, in the above preparation method, the M source is a compound containing M element, and the compound is one or two or more selected from the group consisting of oxides, hydroxides, carbonates, sulfates or acetates, preferably oxides and/or hydroxides.

Preferably, in the above preparation method, the atmospheric pressure of the crushing process is 0.2-0.9 MPa, preferably 0.5-0.8 MPa.

Preferably, in the above preparation method, the nickel cobalt manganese precursor is one or two or more selected from the group consisting of hydroxides, carboxyl oxides or oxides containing nickel, cobalt and manganese elements.

The present invention also provides a lithium ion cathode material, characterized in that, the lithium ion cathode material is prepared according to the above preparation method.

The present invention also provides a lithium ion battery, characterized in that the lithium ion battery comprises the above lithium ion cathode material and the above cathode material.

The present invention also provides a communication, electric power, energy storage or mobile storage device, characterized in that, the storage device is prepared by the above lithium ion battery.

The present invention also provides an application of the above cathode material and the above lithium ion battery as a power source in communication, electric power or energy storage systems, mobile storage devices, or electric vehicles.

The present invention also provides an application of the above cathode material and the above lithium ion battery in the field of mobile digital products (3C), electric vehicles (xEV), electric bicycles, fast-charging buses or passenger cars.

The advantages of the present invention are that: the cathode material of the invention has the advantages of uniform morphology, good structural integrity, simple preparation process and good material consistency. The prepared lithium battery has excellent cycling performance and is convenient for mass-scale production.

DESCRIPTION OF THE PREFERRED EMBODIMENTS

Figure 1:
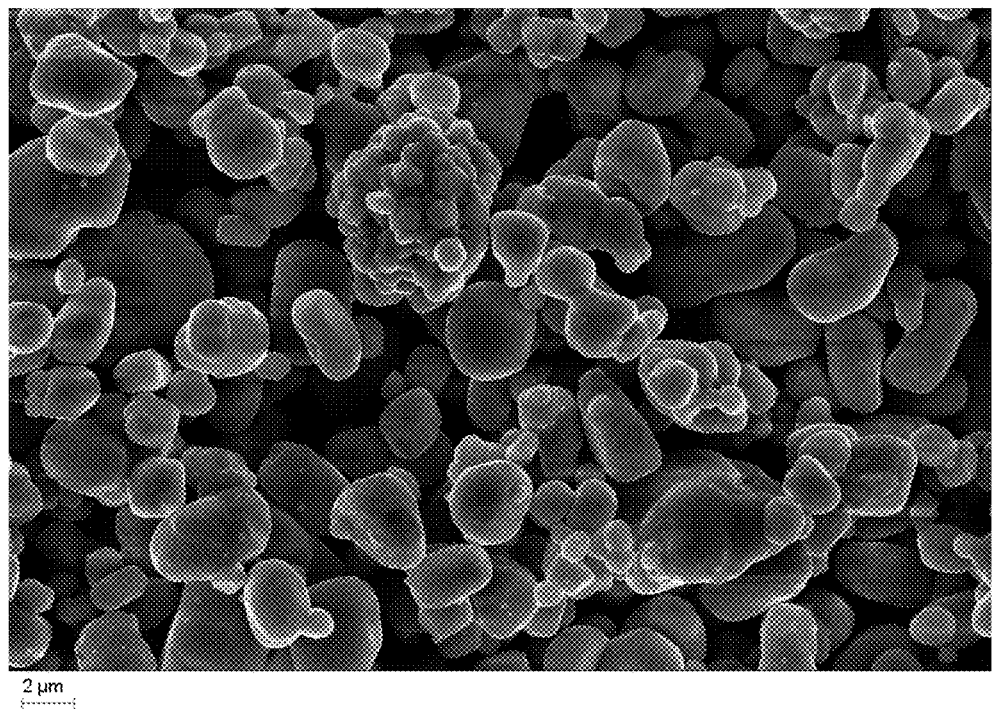
FIG. 1 is a scanning electron microscopy photograph of the cathode material of example 2 of the present invention, the magnification is 3000 times.
Figure 2:
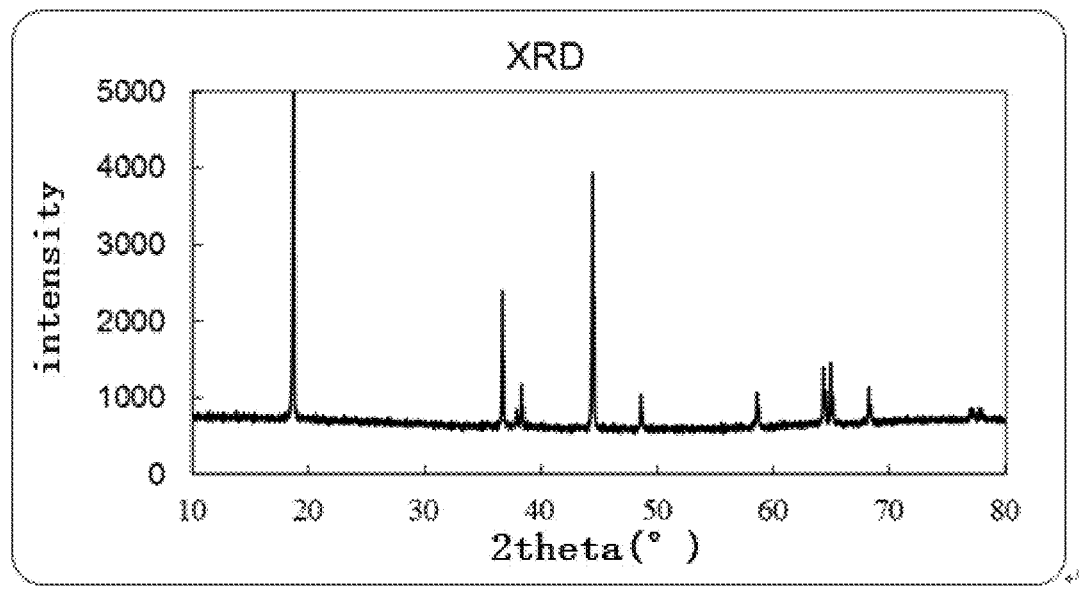
FIG. 2 is an X-ray diffraction spectrum of the cathode material of example 4 of the present invention.

In view of the performance of current lithium ion battery cathode material needs to be improved, the present invention provides the cathode material of the lithium ion battery and power type lithium ion secondary battery with improved electrochemical performance prepared by the cathode material.

In a preferred embodiment, the present invention provides a lithium ion cathode material with homogeneous morphology, good structural integrity, simple process, good material consistency, superior material recycling performance and is convenient for mass-scale production.

Specifically, the present invention provides the following technical solutions:

A lithium ion cathode material, the general formula is: $Li_aNi_xCo_yMn_zM_bO_2$, wherein $1.0 \leq a \leq 1.2$; $0.00 \leq b \leq 0.05$; $0.30 \leq x \leq 0.60$; $0.10 \leq y \leq 0.40$; $0.15 \leq z \leq 0.30$; $x+y+z=1$; M is one or two or more selected from the group consisting of Mg, Ti, Al, Zr, Y, W, Mn, Ba and rare earth elements.

Preferably, in the observation of scanning electron microscope, the cathode material consists of the secondary particles agglomerated by 10 or less primary single crystal particles and the secondary particles agglomerated by more than 10 primary single crystal particles, wherein, the area percentage of the secondary particles agglomerated by less than 10 primary single crystal particles is greater than 80%, preferably greater than 90%, and more preferably 95-100%; and the area percentage of the secondary particles agglomerated by more than 10 primary single crystal particles is less than or equal to 20%, preferably less than or equal to 10%, and more preferably 0%-5%.

Preferably, the powder X-ray diffraction spectrum (XRD) of the cathode material is indicated as a single α-NaFeO$_2$ layered structure.

Preferably, in the above cathode material, the ratio of full width at half maximum FWHM (003) of the (003) diffraction peak at a diffraction angle 2θ of about 18.7° and full width at half maximum FWHM (104) of the (104) diffraction peak at a diffraction angle 2θ of about 44.4° (FWHM (003)/FWHM (104)) is generally 0.9-1.5 in the powder X-ray diffraction spectrum (XRD) of the cathode material.

Preferably, in the powder X-ray diffraction spectrum (XRD) of the above cathode material, the full width at half maximum FWHM (101) of the (101) diffraction peak at a diffraction angle 2θ of about 36.7° is 0.050-0.100.

Preferably, in the powder X-ray diffraction spectrum (XRD) of the above cathode material, the full width at half maximum FWHM (104) of the (104) diffraction peak at a diffraction angle 2θ of about 44.4° is 0.060-0.105, and the crystallite size is 1100~2000 Å.

Preferably, in the powder X-ray diffraction spectrum (XRD) of the above cathode material, the full width at half maximum FWHM (107) of the (107) diffraction peak at a diffraction angle 2θ of about 58.6° is 0.065-0.120, and the crystallite size is 1000~3000 Å.

Preferably, in the above cathode material, the full width at half maximum FWHM (110) of the (110) diffraction peak at a diffraction angle 2θ of about 64.9° is 0.070-0.130.

Preferably, the average particle size of the cathode material is 3.0 μm~8.0 μm.

In the present invention, the crystallite size of the grain refers to the average thickness of the grain perpendicular to the direction of crystal plane.

Preferably, the above preparation method for the above lithium ion battery cathode material, characterized in that, it comprises the following steps:

(1) Mixing a lithium source, a nickel cobalt manganese precursor, and an M source at a molar ratio of Li:(Ni+Co+Mn):M of (1.0-1.2):1.0:(0.00-0.05) to obtain a mixture;

(2) Rebaking, crushing and grading the mixture to obtain the lithium ion battery cathode material.

In the above preparation method, the ratio of M source is greater than 0, and less than or equal to 0.05.

Preferably, in the above preparation method, in the rebaking process, the temperature of the first calcination is 700-1000° C., the temperature of the second calcination is 500-1000° C.

Preferably, in the above preparation method, the time of the first calcination is 5-30 hours and the time of the second calcination is 3-18 hours.

After twice calcination process, the structure of the cathode material can be more stable and complete, and the consistency is better.

Preferably, in the above preparation method, the lithium source is one or more than two selected from the group consisting of lithium hydroxide monohydrate, lithium carbonate, lithium nitrate, lithium fluoride, lithium phosphate, dilithium hydrogen phosphate or lithium dihydrogen phosphate.

Preferably, in the above preparation method, the M source is a compound containing M element, and the compound is one or two or more selected from the group consisting of oxides, hydroxides, carbonates, sulfates or acetates, preferably oxides and/or hydroxides.

The present invention provides a lithium ion cathode material, which is prepared by the above preparation method of the cathode material.

The present invention provides a lithium ion secondary battery, characterized in that, using the above lithium ion cathode material or the lithium ion cathode material obtained by the above preparation method.

The present invention provides an application as a power source in the field of communication, electric power, energy storage or mobile storage devices, or electric vehicles, which is prepared by using the above lithium-ion battery.

The present invention provides the above lithium ion battery used as a power source in the fields of communication, electric power or energy storage systems, mobile storage devices, or electric vehicles.

The present invention provides an application in the field of mobile digital products (3C), electric vehicles (xEV), electric bicycles, fast-charging buses or passenger cars, which is characterized by using the above lithium ion secondary battery.

In another preferably embodiment, in the present invention, the lithium source, the nickel cobalt manganese precursor and the M source are uniformly mixed at a molar ratio of Li:(Ni+Co+Mn):M of (1.0-1.2):1.0:(0.00-0.05), presintering at 700-1000° C. for 5 to 30 hours, cooling and crushing, and then resintering at 500-1000° C. for 3 to 18 hours, cooling to room temperature, crushing and grading and sieving to obtain the lithium ion cathode material.

The crushing equipment used in the present invention is the SHQM type dual planetary ball mill purchased from Lianyungang Chunlong Experimental Instrument Co., Ltd. The airstream smash equipment is MX-50 air flow crusher purchased from Yixing Juneng Superfines equipment Co., Ltd. In the following examples of the present invention, the pressure of the airflow crushing is 0.2-0.9 Mpa.

Figure 4:
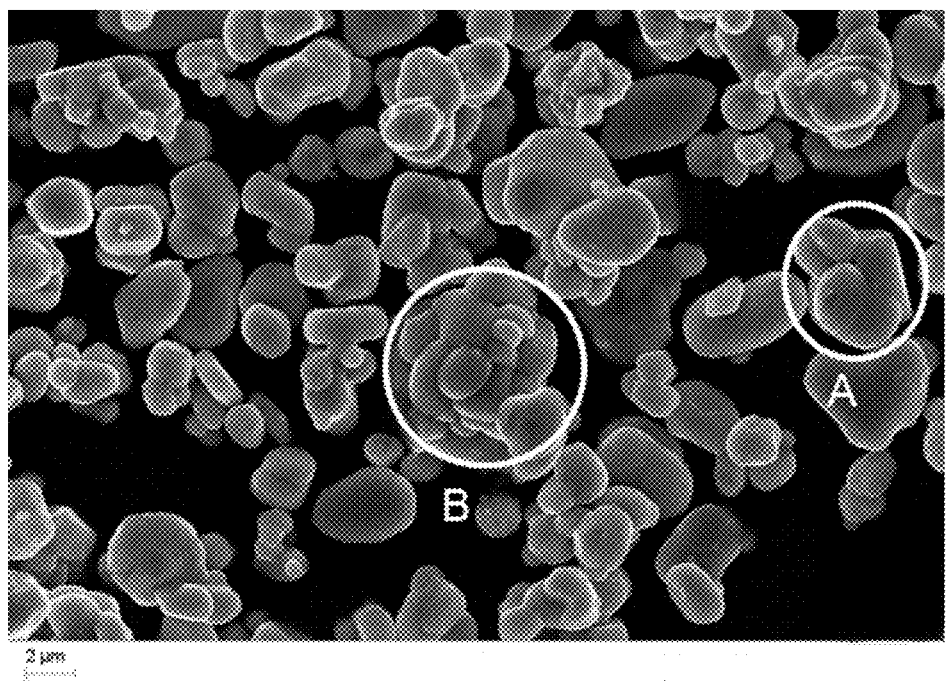
FIG. 4 is a scanning electron microscopy photograph of the cathode material of example 5 of the present invention, the magnification is 3000 times, wherein, A are the secondary particles agglomerated by 10 or less single crystal particles, and B are the secondary particles agglomerated by more than 10 primary single crystal particles.

In the present invention, the secondary particles agglomerated by 10 or less single crystal particles refer to particles formed by less than or equal to 10 single crystal particles bonding together under a scanning electron microscope, as shown in part A in the FIG. 4; and the secondary particles agglomerated by more than 10 of the single crystal particles refer to particles formed by more than 10 single crystal particles bonding together under a scanning electron microscope as shown in part B in the FIG. 4. Wherein, the secondary particles agglomerated by less than 10 primary single crystal particles in the present invention comprise a small amount of primary single crystal particles.

In the present invention, the area percentage of the secondary particles agglomerated by 10 or less primary single crystal particles and the area percentage of the secondary particles agglomerated by more than 10 primary crystal particles are counted statistically by the area of the particles with different morphologies from photographs obtained by the scanning electron microscope. The electron microscopy photographs with areas of all particles which are more than 80% of the area of entire photograph and a total number of particles greater than 50 with same magnification are randomly selected and counted, and the area percentage is obtained by scanning electron microscopy photograph through analysis of image analysis software. Specific the analysis is carried out by the following process: using the image analysis software to calculate an area of secondary particles agglomerated by more than 10 primary single crystal particles and an area of total particles, and the ratio between the two is the area percentage of the secondary particles agglomerated by greater than 10 primary single crystal particles. The area percentage of the secondary particles agglomerated by 10 or more primary single crystal particles is obtained by 100% minus the area percentage of the secondary particles agglomerated by more than 10 primary single crystal particles. In the present invention, the scanning electron microscope is a German Zeiss Supra 55 sapphire field emission scanning electron microscope.

In the present invention, powder X-ray diffractometer is X' pert PRU X-ray diffractometer purchased from Dutch Parnell. Firstly, using Cu-kα as ray source and the diffraction angle 2θ being 0-80°, the lithium ion cathode material is performed by powder X-ray diffraction. Then, based on the results of the measurement, the Trophy analysis was performed to determine the crystal structure of the lithium ion cathode material and the space group of the crystal structure.

In the present invention, other testing equipments is as follows: iCAP-6300 inductively coupled plasma emission spectrometer of American Thermo Scientic; LIP-3AHB06 high temperature formation system of Zhejiang Hangke; CT2001C Test Equipment of Wuhan LAND electronics; KP-BAK-03E-02 efficient vacuum oven of Kerui Electrical, Dongguan City and Supra55 sapphire field emission scanning electron microscope of Germany Zeiss.

The secondary lithium ion battery of the present invention is composed of an electrode, a non-aqueous electrolyte, a separator and a container. Specifically, the electrode includes a positive electrode and a negative electrode, and the positive electrode is made of a material including a positive electrode current collector and a positive electrode active material coated on the positive electrode current collector with a conventional adhesive and a conventional conductive additive or the like, and the positive electrode active material is the lithium ion cathode material of the present invention. The negative electrode is made of a material including collector and a conventional negative electrode active material coated on the collector with a conventional adhesive and a conventional conductive additive or the like. The separator is a PP/PE film conventionally used in the industry for separating the positive and negative electrodes from each other; the container is a containing object of a positive electrode, a negative electrode, a separator, and an electrolyte.

In the following examples, the specific method of manufacturing the secondary lithium ion button cell with the lithium-nickel-cobalt-manganese cathode material of spherical or spherical-like layered structure prepared by the present invention is shown as follows: positive electrode preparation: the lithium-nickel-cobalt-manganese cathode material of spherical or spherical-like layered structure of the present invention, a conductive carbon black (SP) and an adhesive of polyvinylidene fluoride (PVDF) were added into N-Methylpyrrolidone (NMP) (a weight ratio of lithium-nickel-cobalt-manganese cathode material to NMP is 2.1:1) in a weight ratio of 90:5:5 and the mixture was mixed thoroughly, and stirred to form a uniform slurry, and coated on the aluminum foil collector, and dried and pressed into pole pieces. The pressed positive electrode piece was punched, weighed and baked, and then was assembled into battery in a vacuum glove box. Put the bottom shell of the button cell firstly, and foamed nickel (2.5 mm) and negative lithium metal sheet (produced by Tianjin, 99.9%) were put on the top of the bottom shell, 0.5 g electrolytic solution was injected in the condition of relative humidity of less than 1.5% using a mixed solvent of EC (Ethylene carbonate), DEC (diethyl carbonate), and DMC (Dimethyl carbonate) with a mass ratio of EC:DEC:DMC=1:1:1, the electrolyte was 1M hexafluorophosphate, putted the separator and the positive electrode, and then covered the button cell cover and sealed the battery. The model of the button cell is CR2430.

In the following examples, the method of preparing the secondary lithium ion battery full battery by the lithium-nickel-cobalt-manganese cathode material of the spherical or spherical-like layered structure prepared by the present invention is shown as follows:

Positive cathode preparation: the lithium-nickel-cobalt-manganese cathode material of the spherical or spherical-like layered structure of the present invention, conductive carbon black (SP) and an adhesive of polyvinylidene fluoride (PVDF) were added into N-Methylpyrrolidone (NMP) (a weight ratio of lithium-nickel-cobalt-manganese cathode material to NMP is 2.1:1) in a weight ratio of 94:3:3, the mixture was mixed thoroughly, stirred to form a uniform slurry, coated on the aluminum foil collector, dried and pressed to form an electrode.

Negative electrode preparation: negative artificial graphite, conductive carbon black (S.P), carboxymethyl cellulose (CMC) and an adhesive (SBR) at a weight ratio of 95:1:1:3 were added into a sufficient amount of pure water, and the mixture was mixed and stirred to form a uniform slurry, coated on a copper foil collector, dried and pressed to form an electrode. The separator is PP/PE composite film material. Lug was spotted weld to the pressed positive and negative electrode, the separator was inserted, the materials were rolled in the winding machine and then put into the soft package fixture, and then sealed the top and side of the soft package, and then baked in the oven, and then 9 g of electrolytic solution was injected in the condition of relative humidity of less than 1.5% using a mixed solvent of DE (diethyl carbonate), DEC (diethyl carbonate), and DMC (Dimethyl carbonate) with a mass ratio of EC:DEC:DMC=1:1:1, the electrolyte was 1M lithium hexafluorophosphate. After injection and formation for 48 hours, the soft package was vacuumed and sealed. The battery model is 454261.

The charging and discharging test of the secondary lithium ion experiment battery prepared by the present invention was tested on the Wuhan LAND electronics battery tester according to the test method of GB/T18287-2000.

The material of the present invention, preparation method and application thereof will be described with reference to specific examples.

TABLE 1 the reagent information used in the embodiment of the present invention

| Reagent name | Grade | Model | Manufacture |
| --- | --- | --- | --- |
| nickel cobalt manganese precursor | Ni:Co:Mn = 3:3:3 | chemical formula: $Ni_{1/3}Co_{1/3}Mn_{1/3}(OH)_2$ | Hunan Brunp Recycling Technology Co., Ltd. |

TABLE 1-continued the reagent information used in the embodiment of the present invention

| Reagent name | Grade | Model | Manufacture |
|---|---|---|---|
| nickel cobalt manganese precursor | Ni:Co:Mn = 5:2:3 | chemical formula: $Ni_{0.5}Co_{0.2}Mn_{0.3}(OH)_2$ or $Ni_{0.5}Co_{0.2}Mn_{0.3}O_2$ | Hunan Brunp Recycling Technology Co., Ltd. |
| nickel cobalt manganese precursor | Ni:Co:Mn = 2:1:1 | chemical formula: $Ni_{0.5}Co_{0.25}Mn_{0.25}(OH)_2$ | Hunan Brunp Recycling Technology Co., Ltd. |
| nickel cobalt manganese precursor | Ni:Co:Mn = 6:2:2 | chemical formula: $Ni_{0.6}Co_{0.2}Mn_{0.2}O_2$ | Hunan Brunp Recycling Technology Co., Ltd. |
| nanometer magnesia | ceramic grade | — | Anhui Xuancheng Jingrui New material Co., Ltd. |
| magnesium hydroxide | reagent grade | 98.0 wt % | Nanjing Chemical Reagent Co., Ltd. |
| Yttrium sulfate octahydrate | reagent grade | 99.0 wt % | Nanjing Chemical Reagent Co., Ltd. |
| nano zirconia | ceramic grade | — | Anhui Xuancheng Jingrui New material Co., Ltd. |
| nano titanium dioxide | ceramic grade | — | Anhui Xuancheng Jingrui New material Co., Ltd. |
| Lithium hydroxide monohydrate | Battery grade | 99.5 wt % | Jingxi Ganfeng LIthium Co., Ltd. |
| Lithium Carbonate | Battery grade | 99.5 wt % | Jingxi Ganfeng LIthium Co., Ltd. |
| lithium nitrate | Battery grade | 99.5 wt % | Shanghai Oujin Lithium Industrial Co., Ltd. |
| lithium fluoride | Battery grade | 99.5 wt % | Jingxi Ganfeng LIthium Co., Ltd. |
| High purity oxygen | Industrial grade | Purity: 99.95% | Shenzhen Nanshan Gas Station |
| conductive carbon black | Battery grade | Super P Li | Swiss TIMCAL Company |
| N-methylpyrrolidone | Battery grade | 99.5% of content | Jiangsu Nanjing Jinlong Chemical factory |
| polyvinylidene difluoride | Battery grade | Solef 6020 | Solvay chemical company of America |
| aluminum foil | Battery grade | 16 μm thick | Alcoa Inc., AA |
| electronic tape | electronic grade | green, width of 10 mm | 3M Company of America |
| Lithium sheet | electronic grade | a diameter Φ of 20 mm, purity ≥99.9% | Shanghai Shunyou Metal Material Co., Ltd |
| electrolytic solution | electronic grade | . . . ;Dimethyl carbonate(DMC):Ethylene carbonate(EC):diethyl carbonate(DEC) = 1:1:1(volume ratio), . . . | Shenzhen Capchem Company |
| separator | — | three layer material of PP/PE/PP, Celgard M825, thickness of 16 μm. | Celgard Company of America |
| Aluminum-plastic film | industrial grade | a total thickness of 160 μm | DNP Company of Japan |

Example 1

Lithium fluoride and a nickel-cobalt-manganese hydroxide precursor with a molar ratio of Ni:Co:Mn=3:3:3 and nano zirconia powder were mixed by ball-milling for 40 min with a rotation speed of 200 rpm, wherein the molar ratio of Li:(Ni+Co+Mn):Zr was 1.15:1:0.3 and a total mass of obtained mixture was 1317.5 g. After mixing uniformly, a mixture was discharged. The mixture was placed into a muffle furnace and the mixture was heated in an air atmosphere at a heating rate of 10° C./min to 1000° C. and sintered for 12 hours, cooling to room temperature. After ball-milling for 10 min at a rotation speed of 200 rpm, the milled material was then placed into the muffle furnace and the mixture was heated in an air atmosphere at a heating rate of 15° C./min to 930° C. and sintered for 8 hours, cooling to room temperature. After air-blast pulverizing at air pressure of 0.8 Mpa, the undersize material (i.e. a lithium ion cathode material 1) was obtained with a 300 mesh metal sieve (Test sieves of metal wire cloth of GBT 6003.1-1997).

The lithium ion cathode material 1 was tested by scanning electron microscopy, and the figure showed that, the area percentage of the secondary particles agglomerated by 10 or less primary single crystal particles is 100%, and the area percentage of the secondary particles agglomerated by more than 10 primary single crystal particles is 0.

The cathode material 1 was subjected to test analysis by X-ray diffraction, and the data was shown in table 2. The cathode material 1 was subjected to a cyclic test, and the cycle data is shown in Table 2.

Example 2

Lithium carbonate and a nickel-cobalt-manganese hydroxide precursor with a molar ratio of Ni:Co:Mn=5:2:3 and a nano-titanium dioxide powder were mixed by ball-milling for 40 min with a rotation speed of 200 rpm, wherein the molar ratio of Li:(Ni+Co+Mn):Ti was 1.07:1:0.5 and total mass of obtained mixture was 1447.3 g. After mixing uniformly, a mixture was discharged. The mixture was placed into a muffle furnace and the mixture was heated in an air atmosphere at a heating rate of 10° C./min to 950° C. and sintered for 14 hours, cooling to room temperature. After ball-milling for 10 min at a rotation speed of 200 rpm, the milled material was then placed into the muffle furnace and the mixture was heated in an air atmosphere at a heating rate of 15° C./min to 900° C. and sintered for 15 hours, cooling to room temperature. After air-blast pulverizing at air pressure of 0.8 Mpa, the undersize material (i.e. a lithium ion cathode material 2) was obtained with a 300 mesh metal sieve (Test sieves of metal wire cloth of GBT 6003.1-1997).

The lithium ion cathode material 2 was tested by scanning electron microscopy, and the figure showed that, the area percentage of the secondary particles agglomerated by 10 or less primary single crystal particles is 96%, and the area percentage of the secondary particles agglomerated by more than 10 primary single crystal particles is 4%. The scanning electron microscopy photograph is shown in FIG. 1, and the magnification is 3000 times.

The cathode material 2 was subjected to test analysis by X-ray diffraction, and the data was shown in table 2.

The cathode material 2 was subjected to a cyclic test, and the cycle data is shown in Table 2.

Example 3

Lithium carbonate and a nickel-cobalt-manganese hydroxide precursor with a molar ratio of Ni:Co:Mn=5:2:3 were mixed by ball-milling for 40 min with a rotation speed of 200 rpm, wherein the molar ratio of Li:(Ni+Co+Mn) was 1.07:1 and total mass of obtained mixture was 1447.3 g. After mixing uniformly, a mixture was discharged. The mixture was placed into a muffle furnace and the mixture was heated in an air atmosphere at a heating rate of 10° C./min to 900° C. and sintered for 30 hours, cooling to room temperature. After ball-milling for 40 min at a rotation speed of 200 rpm, the milled material was then placed into the muffle furnace and the mixture was heated in an air atmosphere at a heating rate of 15° C./min to 950° C. and sintered for 3 hours, cooling to room temperature. After air-blast pulverizing at air pressure of 0.8 Mpa, the undersize material (i.e. a lithium ion cathode material 3) was obtained with a 300 mesh metal sieve (Test sieves of metal wire cloth of GBT 6003.1-1997).

The lithium ion cathode material 3 was tested by scanning electron microscopy, and the figure showed that, the area percentage of the secondary particles agglomerated by 10 or less primary single crystal particles is 90%, and the area percentage of the secondary particles agglomerated by more than 10 primary single crystal particles is 10%.

The cathode material 3 was subjected to test analysis by X-ray diffraction, and the data was shown in table 2.

The cathode material 3 was subjected to a cyclic test, and the cycle data is shown in Table 2.

Example 4

Lithium nitrate and a nickel-cobalt-manganese hydroxide precursor with a molar ratio of Ni:Co:Mn=2:1:1 and magnesium hydroxide were mixed by ball-milling for 40 min with a rotation speed of 200 rpm, wherein the molar ratio of Li:(Ni+Co+Mn):Mg was 1.00:1:0.2 and total mass of obtained mixture was 1764.1 g. After mixing uniformly, a mixture was discharged. The mixture was placed into a muffle furnace and the mixture was heated in an air atmosphere at a heating rate of 10° C./min to 700° C. and sintered for 18 hours, cooling to room temperature. After ball-milling for 10 min at a rotation speed of 200 rpm, the milled material was then placed into the muffle furnace and the mixture was heated in an air atmosphere at a heating rate of 15° C./min to 980° C. and sintered for 18 hours, cooling to room temperature. After air-blast pulverizing at air pressure of 0.8 Mpa, the undersize material (i.e. a lithium ion cathode material 4) was obtained with a 300 mesh metal sieve (Test sieves of metal wire cloth of GBT 6003.1-1997).

The lithium ion cathode material 4 was tested by scanning electron microscopy, and the figure showed that, the area percentage of the secondary particles agglomerated by 10 or less primary single crystal particles is 95%, and the area percentage of the secondary particles agglomerated by more than 10 primary single crystal particles is 5%.

The cathode material 4 was subjected to test analysis by X-ray diffraction, and the data was shown in table 2.

The cathode material 4 was subjected to a cyclic test, and the cycle data is shown in Table 2.

Example 5

Lithium hydroxide monohydrate and a nickel-cobalt-manganese oxide precursor with a molar ratio of Ni:Co:Mn=6:2:2 and yttrium sulfate octahydrate were mixed by ball-milling for 40 min with a rotation speed of 200 rpm, wherein the molar ratio of Li:(Ni+Co+Mn):Y was 1.2:1:0.1 and total mass of obtained mixture was 1498.3 g. After mixing uniformly, a mixture was discharged. The mixture was placed into a muffle furnace and the mixture was heated in an air atmosphere at a heating rate of 10° C./min to 820° C. and sintered for 8 hours, cooling to room temperature. After ball-milling for 10 min at a rotation speed of 200 rpm, the milled material was then placed into the muffle furnace and the mixture was heated in an air atmosphere at a heating rate of 15° C./min to 880° C. and sintered for 15 hours, cooling to room temperature. After air-blast pulverizing at air pressure of 0.8 Mpa, the undersize material (i.e. a lithium ion cathode material 5) was obtained with a 300 mesh metal sieve (Test sieves of metal wire cloth of GBT 6003.1-1997).

The lithium ion cathode material 5 was tested by scanning electron microscopy, and the figure showed that, the area percentage of the secondary particles agglomerated by 10 or less primary single crystal particles is 81%, and the area percentage of the secondary particles agglomerated by more than 10 primary single crystal particles is 19%. The scanning electron microscopy photograph is shown in FIG. 4, and the magnification is 3000 times.

The cathode material 5 was subjected to test analysis by X-ray diffraction, and the data was shown in table 2. The cathode material 5 was subjected to a cyclic test, and the cycle data is shown in Table 2.

Comparative Example 1

Lithium carbonate and a nickel-cobalt-manganese hydroxide precursor with a molar ratio of Ni:Co:Mn=5:2:3 were mixed by ball-milling for 20 min with a rotation speed of 750 rpm, wherein the molar ratio of Li:(Ni+Co+Mn) was 1.06:1 and total mass of obtained mixture was 1442.6 g. After mixing uniformly, a mixture was discharged. The mixture was placed into a muffle furnace and the mixture was heated in an air atmosphere at a heating rate of 35° C./min to 930° C. and sintered for 10 hours, naturally cooling to room temperature. After ball-milling for 30 min at a rotation speed of 1500 rpm, the milled material was discharged. The undersize material (i.e. a lithium ion cathode material D1) was obtained with a 300 mesh metal sieve (Test sieves of metal wire cloth of GBT 6003.1-1997).

Figure 3:
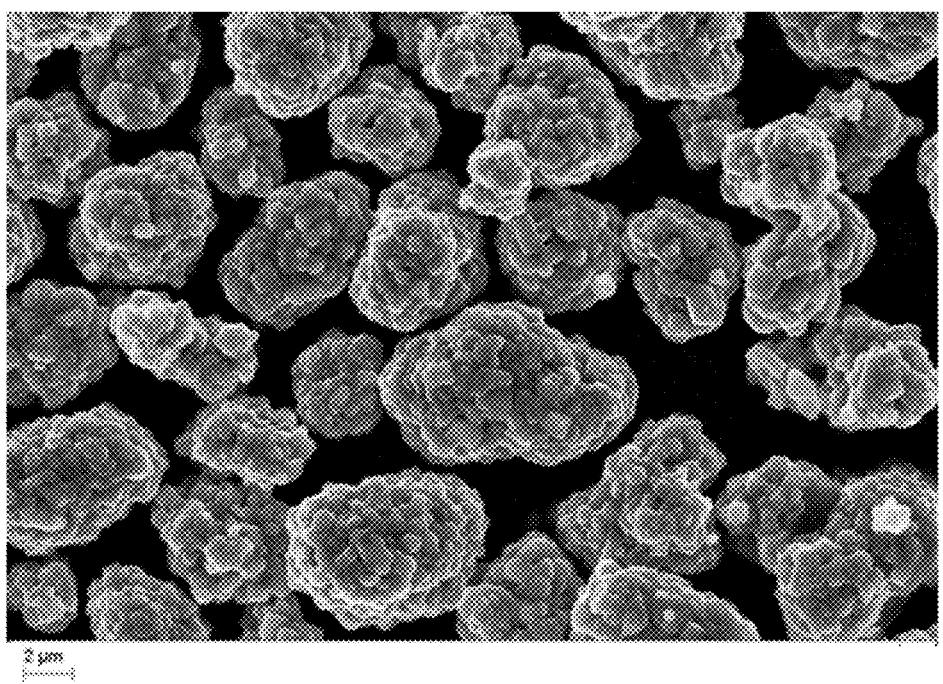
FIG. 3 is a scanning electron microscopy photograph of the cathode material of comparative example 1 of the present invention, the magnification is 3000 times.

The lithium ion cathode material was tested by scanning electron microscopy, and the figure showed that, the area percentage of the secondary particles agglomerated by 10 or less primary single crystal particles is 0%, and the area percentage of the secondary particles agglomerated by more than 10 primary single crystal particles is 100%. The scanning electron microscopy photograph is shown in FIG. 3, and the magnification is 3000 times.

The cathode material was subjected to test analysis by X-ray diffraction, and the data was shown in table 2. The cathode material was subjected to a cyclic test, and the cycle data is shown in Table 2.

As seen from the table 2, the lithium battery prepared by the cathode material of the present invention still has a capacity retention rate of 91%-96% under the condition of 4.2V, a temperature of 60° C. and a cycle of 500 times; and the above lithium battery still has a capacity retention rate of 91%-95% under the condition of 4.4V, a temperature of 45° C. and a cycle of 200 times. The performance of lithium battery prepared by the cathode material of the present invention is better than that of comparative example 1, indicating that the lithium battery prepared by the cathode material of the present invention has good cycle property and more stable property.

The invention claimed is:

1. A lithium ion battery cathode material, characterized in that, the general formula thereof is $Li_aNi_xCo_yMn_zM_bO_2$, wherein, $1.0 \leq a \leq 1.2$; $0.00 \leq b \leq 0.05$; $0.30 \leq x \leq 0.60$; $0.10 \leq y \leq 0.40$; $0.15 \leq z \leq 0.30$; $x+y+z=1$; M element is one or two or more selected from the group consisting of Mg, Ti, Al, Zr, Y, W, Mn, Ba and rare earth elements; the scanning electron microscope observation shows that the cathode material consists of the secondary particles agglomerated by 10 or less primary single crystal particles and secondary particles agglomerated by more than 10 primary single crystal particles, wherein, area percentage of the secondary particles agglomerated by 10 or less primary single crystal particles is greater than 80% of the total area of the scanning electron microscopy (SEM) image, and area percentage of the secondary particles agglomerated by more than 10 primary single crystal particles is less than 20% of the total area of the SEM image, wherein, in the X-ray diffraction spectrum of the cathode material, the full width at half maximum FWHM (107) of the (107) diffraction peak at a

TABLE 2 characterization data of the cathode material obtained in the examples

| examles | ratio of the secondary particles agglomerated by less than 10 primary single crystal particles (%) | ratio of the secondary particles agglomerated by more than 10 primary single crystal particles (%) | full width at half maximum FWHM (°) | | | | | crystalline size (Å) | | capacity retention ratio (%) | |
|---|---|---|---|---|---|---|---|---|---|---|---|
| | | | (003)/(104) | (101) | (104) | (107) | (110) | (104) | (107) | 4.2 V 60° C. @500 times | 4.4 V 45° C. @200 times |
| 1 | 100 | 0 | 0.91 | 0.051 | 0.064 | 0.071 | 0.076 | 1200 | 1200 | 93.92% | 93.91% |
| 2 | 96 | 4 | 1.16 | 0.071 | 0.080 | 0.086 | 0.085 | 1652 | 1614 | 95.89% | 94.59% |
| 3 | 90 | 10 | 1.15 | 0.072 | 0.081 | 0.086 | 0.089 | 1635 | 1532 | 93.19% | 93.12% |
| 4 | 95 | 5 | 1.47 | 0.085 | 0.103 | 0.113 | 0.113 | 1923 | 2618 | 93.57% | 92.16% |
| 5 | 81 | 19 | 1.27 | 0.076 | 0.088 | 0.100 | 0.096 | 1320 | 1335 | 91.89% | 91.51% |
| D1 | 0 | 100 | 0.82 | 0.13 | 0.152 | 0.19 | 0.186 | 949 | 741 | 85.63% | 82.07% |

In the table 2, in the cathode material prepared by the examples of the present invention, the ratio of full width at half maximum FWHM of the (003) diffraction peak and full width at half maximum FWHM of the (104) diffraction peak is 0.9-1.5, the full width at half maximum FWHM of the (104) diffraction peak is 0.060-0.105, the full width at half maximum FWHM of the (101) diffraction peak is 0.050-0.10, the full width at half maximum FWHM of the (107) diffraction peak is 0.065-0.120, and the full width at half maximum FWHM of the (110) diffraction peak is 0.070-0.13. Wherein, the crystallite size of the (104) diffraction peak is 1200~2000 Å, and the crystallite size of the (107) diffraction peak is 1200~2700 Å.

diffraction angle 2θ of about 58.6° is 0.065-0.120, and a crystallite size is 1000-3000 Å.

2. The cathode material according to claim 1, wherein, in the X-ray diffraction spectrum of the cathode material, the ratio of full width at half maximum FWHM (003) of the (003) diffraction peak at a diffraction angle 2θ of about 18.7° to full width at half maximum FWHM (104) of the (104) diffraction peak at a diffraction angle 2θ of about 44.4°, i.e., FWHM (003)/FWHM (104), is 0.9-1.5.

3. The cathode material according to claim 2, wherein, in the X-ray diffraction spectrum of the cathode material, the full width at half maximum FWHM (101) of the (101) diffraction peak at a diffraction angle 2θ of about 36.7° is 0.050-0.100.

4. The cathode material according to claim 2, wherein, in the X-ray diffraction spectrum of the cathode material, the full width at half maximum FWHM (104) of the (104) diffraction peak at a diffraction angle 2θ of about 44.4° is 0.060-0.105, and a crystallite size is 1100-2000 Å.

5. The cathode material according to claim 2, wherein, in the X-ray diffraction spectrum of the cathode material, the full width at half maximum FWHM (110) of the (110) diffraction peak at a diffraction angle 2θ of about 64.9° is 0.070-0.130.

6. The cathode material according to claim 1, wherein, the area percentage of the secondary particles agglomerated by 10 or less primary single crystal particles is greater than 85%.

7. The cathode material according to claim 6, wherein, the area percentage of the secondary particles agglomerated by 10 or less primary single crystal particles is greater than 90%.

8. The cathode material according to claim 7, wherein, the area percentage of the secondary particles agglomerated by more than 10 primary single crystal particles is less than 10%.

9. The cathode material according to claim 7, wherein, the area percentage of the secondary particles agglomerated by more than 10 primary single crystal particles is 0%-5%.

10. The cathode material according to claim 6, wherein, the area percentage of the secondary particles agglomerated by 10 or less primary single crystal particles is 95%-100%.

11. The cathode material according to claim 6, wherein, the area percentage of the secondary particles agglomerated by more than 10 primary single crystal particles is less than 15%.

12. The cathode material according to claim 6, wherein, in the X-ray diffraction spectrum of the cathode material, the full width at half maximum FWHM (101) of the (101) diffraction peak at a diffraction angle 2θ of about 36.7° is 0.050-0.100.

13. The cathode material according to claim 6, wherein, in the X-ray diffraction spectrum of the cathode material, the full width at half maximum FWHM (104) of the (104) diffraction peak at a diffraction angle 2θ of about 44.4° is 0.060-0.105, and a crystallite size is 1100-2000 Å.

14. The cathode material according to claim 1, wherein, in the X-ray diffraction spectrum of the cathode material, the full width at half maximum FWHM (101) of the (101) diffraction peak at a diffraction angle 2θ of about 36.7° is 0.050-0.100.

15. The cathode material according to claim 1, wherein, in the X-ray diffraction spectrum of the cathode material, the full width at half maximum FWHM (104) of the (104) diffraction peak at a diffraction angle 2θ of about 44.4° is 0.060-0.105, and a crystallite size is 1100-2000 Å.

16. The cathode material according to claim 1, wherein, the crystallite size of the (107) diffraction peak is 1200-2700 Å.

17. The cathode material according to claim 1, wherein, in the X-ray diffraction spectrum of the cathode material, the full width at half maximum FWHM (110) of the (110) diffraction peak at a diffraction angle 2θ of about 64.9° is 0.070-0.130.

18. A lithium ion battery, characterized in that, the lithium ion battery comprises the lithium ion cathode material of claim 1.

19. A communication, electric power, energy storage or mobile storage device, characterized in that, it is prepared by the lithium ion battery of claim 18.

* * * * *